(12) United States Patent
Ito et al.

(10) Patent No.: US 6,684,374 B2
(45) Date of Patent: Jan. 27, 2004

(54) TIMING BUDGET DESIGNING METHOD

(75) Inventors: Noriyuki Ito, Kawasaki (JP); Ryoichi Yamashita, Kawasaki (JP); Yoichiro Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 09/984,782

(22) Filed: Oct. 31, 2001

(65) Prior Publication Data

US 2003/0014720 A1 Jan. 16, 2003

(30) Foreign Application Priority Data

Jul. 12, 2001 (JP) .................................. 2001-211556

(51) Int. Cl.[7] .............................................. G06F 17/50
(52) U.S. Cl. ................................ 716/6; 716/10; 716/18
(58) Field of Search ........................... 716/1–18; 703/19

(56) References Cited

U.S. PATENT DOCUMENTS

| | | | | |
|---|---|---|---|---|
| 5,095,454 A | * | 3/1992 | Huang ........................ 703/19 |
| 5,526,277 A | * | 6/1996 | Dangelo et al. ................ 716/3 |
| 5,903,472 A | * | 5/1999 | Barrientos .................... 716/10 |
| 6,389,580 B1 | * | 5/2002 | Ozaki ............................ 716/6 |
| 6,415,426 B1 | * | 7/2002 | Chang et al. ................... 716/9 |
| 6,493,863 B1 | * | 12/2002 | Hamada et al. ............... 716/18 |
| 6,510,542 B1 | * | 1/2003 | Kojima ......................... 716/10 |

* cited by examiner

Primary Examiner—Matthew Smith
Assistant Examiner—Paul Dinh
(74) Attorney, Agent, or Firm—Staas & Halsey LLP

(57) ABSTRACT

When a logical block is built in an LSI logic design stage, a maximum delay value between pins of a block is set based on a designer's estimation, or information of a netlist after the netlist is generated. Pins can be grouped. A delay value in a connection between pins is represented by the largest value. Additionally, a plurality of internal memory elements within a logical block are represented by one or a plurality of internal latches. Also as a delay value between a pin and an internal latch, or between an internal latch and a pin, the largest value is selected from among a plurality of delay values, and set as a representative value.

3 Claims, 18 Drawing Sheets

```
model logical_block_name ;
   pingrp A ADDRA_T[0:11],ADDRA_C[0:11],ADDRB_T[0:11],ADDRB_C[0:11],
          NULL_T[0:2],NULL_C[0:2],...;
   pingrp B DOUT[0:11],XDOUT[0:11];
   IL   0   FF1,FF2,FF3....
   path from A to B delay 500;
   path from A to OFLG delay 600;
   path from A to IL delay 250;
   path from IL to B delay 230;
   path from CK0 to B delay 450;
   path from CK1 to B delay 430;
   path from RST0 to B delay 400;
   path from RST1 to B delay 420;
end ;
```

```
model logical_block_name ;
    pingrp A ADDRA_T[0:11],ADDRA_C[0:11],ADDRB_T[0:11],ADDRB_C[0:11],
        NULL_T[0:2],NULL_C[0:2],...;
    pingrp B DOUT[0:11],XDOUT[0:11];
IL   0   FF1,FF2,FF3,...
    path from A to B delay 500;
    path from A to OFLG delay 600;
    path from A to IL delay 250;
    path from IL to B delay 230;
    path from CK0 to B delay 450;
    path from CK1 to B delay 430;
    path from RST0 to B delay 400;
    path from RST1 to B delay 420;
(a) → path from A to Block1.in1 delay 200;
    path from A to Block1.in2 delay 150;
    path from Block1.out1 to B delay 300;
    path from Block1.out2 to B delay 250;

end ;
```

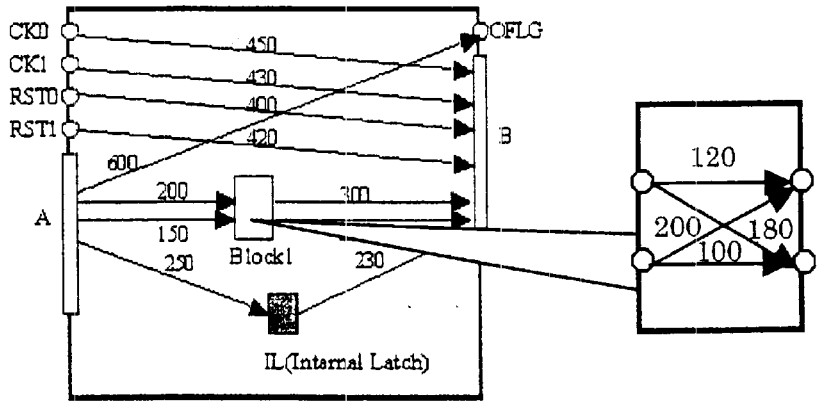

FIG. 3

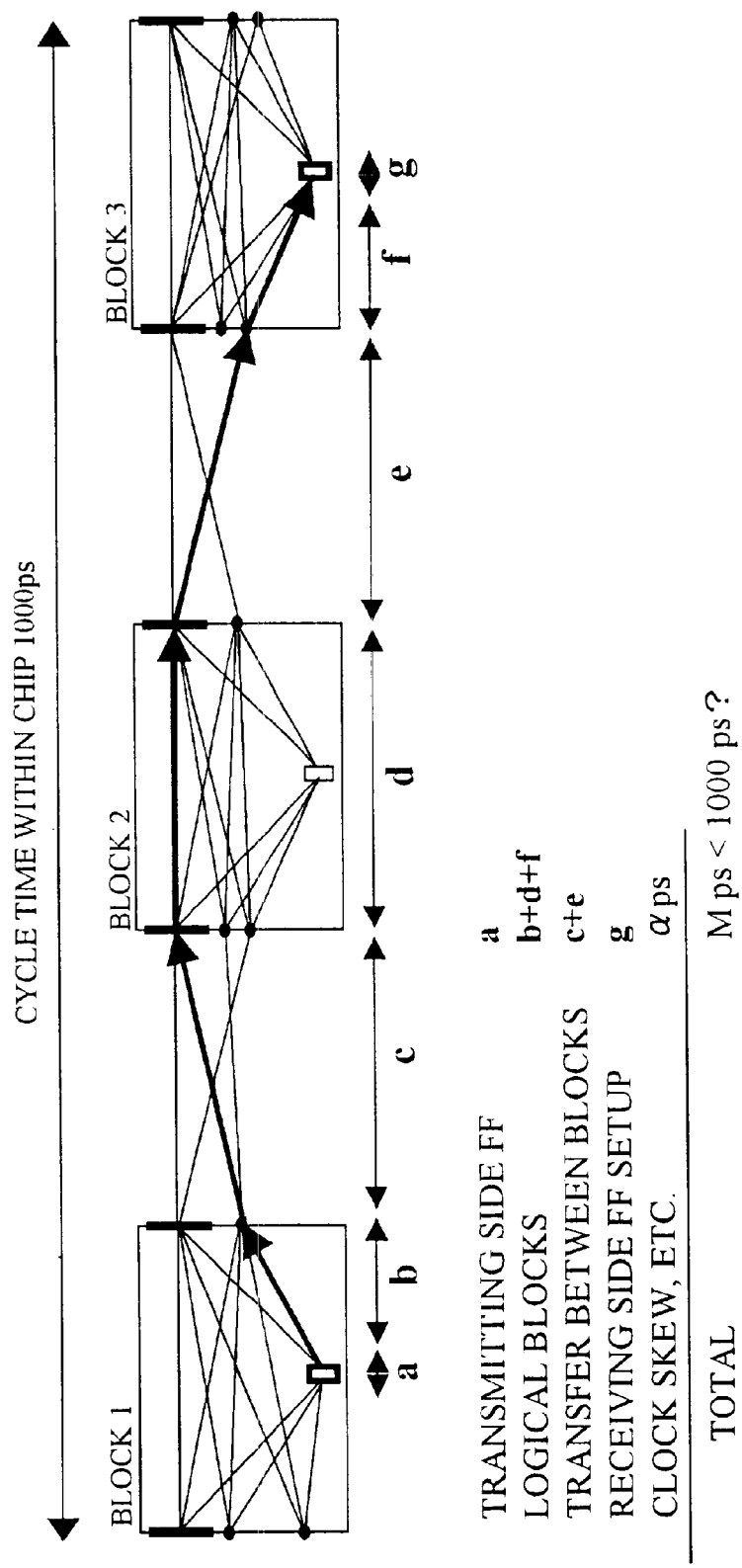
F I G. 5

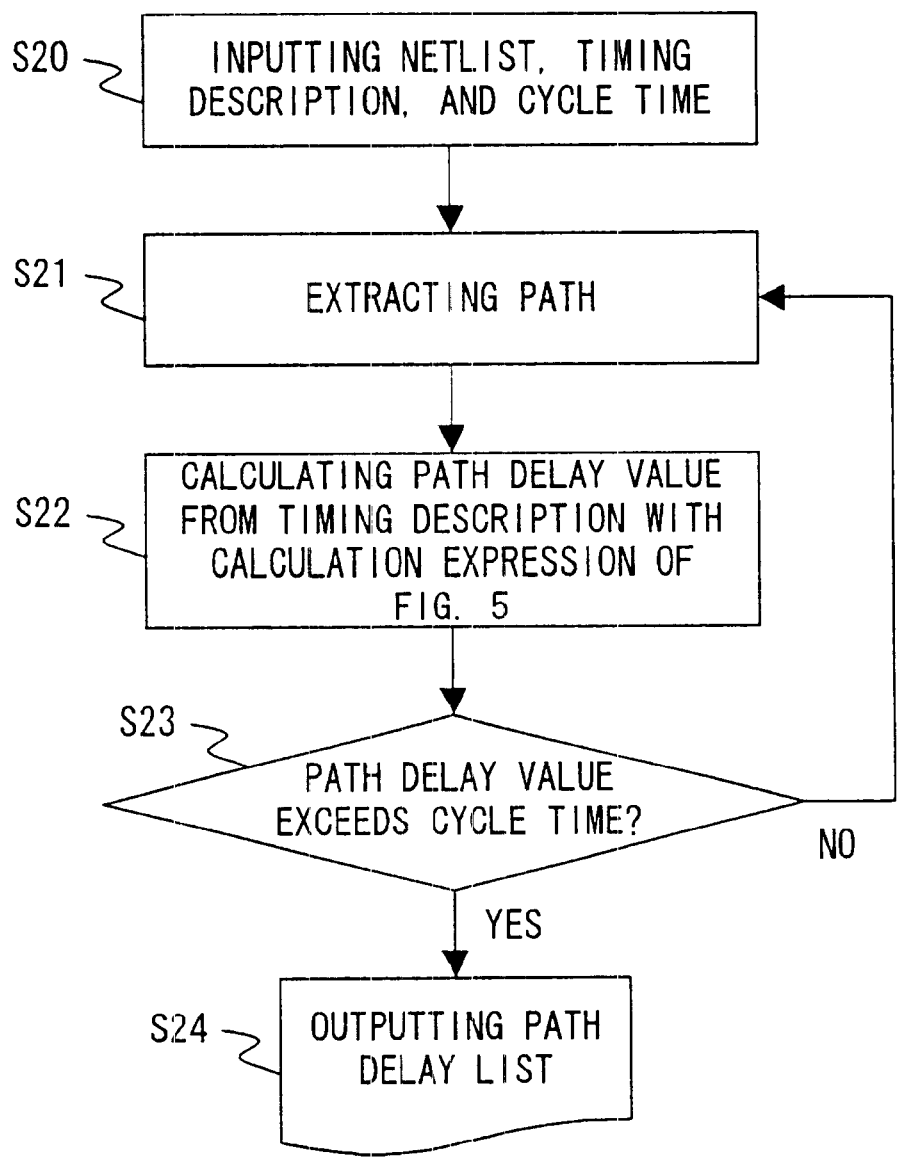
F I G. 6

FIG. 7

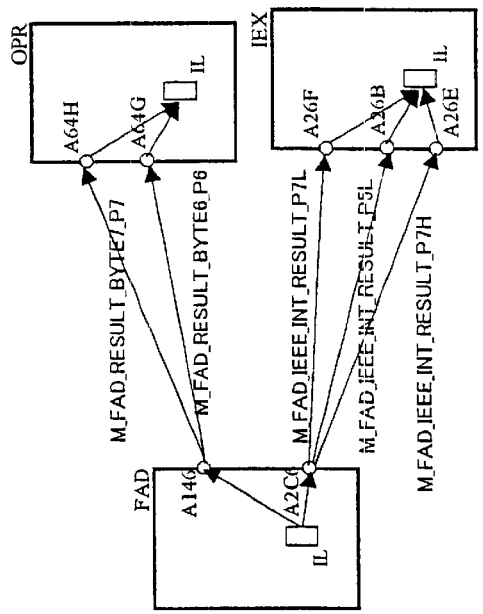

| No | Kind | From | Netname | To | Delay | Total | Diff |
|----|------|------|---------|-----|-------|-------|------|
| 1 | FF->Out | FAD(Internal Latch) | - | FAD A148 | 1552 | 1552 | * |
|   | BLOCK->BLOCK | FAD A148 | M FAD RESULT BYTE7 P7 | OPR A64H | 0 | 1552 | * |
|   | In->FF | OPR A64H | - | OPR(Internal Latch) | 129 | 1681 | 681 |

| No | Kind | From | Netname | To | Delay | Total | Diff |
|----|------|------|---------|-----|-------|-------|------|
| 2 | FF->Out | FAD(Internal Latch) | - | FAD A146 | 1546 | 1546 | * |
|   | BLOCK->BLOCK | FAD A146 | M FAD RESULT BYTE6 P6 | OPR A64G | 0 | 1546 | * |
|   | In->FF | OPR A64G | - | OPR(Internal Latch) | 129 | 1675 | 675 |

| No | Kind | From | Netname | To | Delay | Total | Diff |
|----|------|------|---------|-----|-------|-------|------|
| 3 | FF->Out | FAD(Internal Latch) | - | FAD A2C6 | 1465 | 1465 | * |
|   | BLOCK->BLOCK | FAD A2C6 | M FAD IEEE INT RESULT P7L | IEX A26F | 0 | 1465 | * |
|   | In->FF | IEX A26F | - | IEX(Internal Latch) | 76 | 1541 | 541 |

| No | Kind | From | Netname | To | Delay | Total | Diff |
|----|------|------|---------|-----|-------|-------|------|
| 4 | FF->Out | FAD(Internal Latch) | - | FAD A2C2 | 1465 | 1465 | * |
|   | BLOCK->BLOCK | FAD A2C2 | M FAD IEEE INT RESULT P5L | IEX A26B | 0 | 1465 | * |
|   | In->FF | IEX A26B | - | IEX(Internal Latch) | 76 | 1541 | 541 |

| No | Kind | From | Netname | To | Delay | Total | Diff |
|----|------|------|---------|-----|-------|-------|------|
| 5 | FF->Out | FAD(Internal Latch) | - | FAD A2C5 | 1462 | 1462 | * |
|   | BLOCK->BLOCK | FAD A2C5 | M FAD IEEE INT RESULT P7H | IEX A26E | 0 | 1462 | * |
|   | In->FF | IEX A26E | - | IEX(Internal Latch) | 76 | 1538 | 538 |

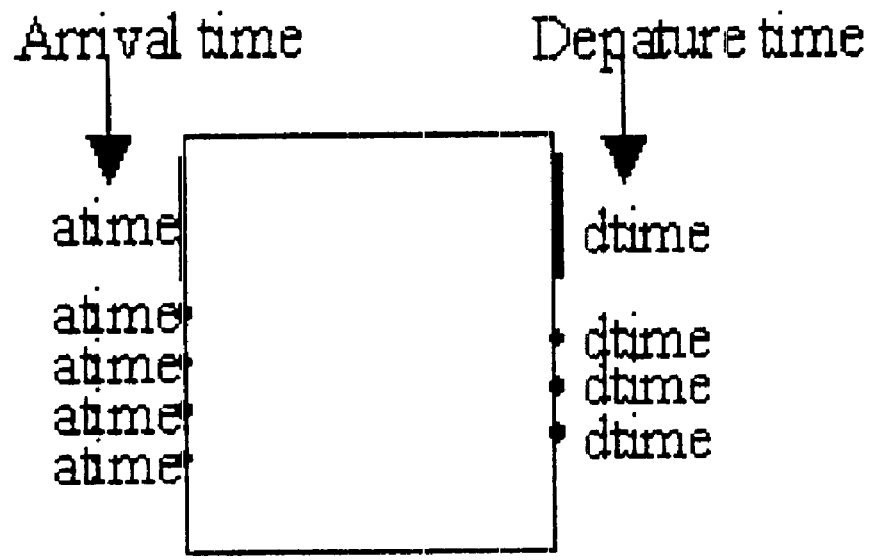
```
block BLOCK1 ;
    input_delay   431.00    A01 ;
    input_delay   423.00    A02 ;
    input_delay   531.00    A03 ;
    ...
    output_delay  802.00    O01 ;
    output_delay  822.00    O02 ;
    ...
end ;
```
F I G. 8

```
model CZEU2ALU A;
  IL1    0 B013B, B013E, B013H, B013L, B013P, B12XB, B12XG, B203B, B203E, B203H, B203L;
  IL2  100 B113B, B113E, B113H, B113L, B303B, B303E, B303H, B303L;
  IL3  300 B403B, B403E, B403H, B403L, B40LB, B40LE;
  IL4 -100 G827B, G827F, G827M, G914B, G914E;
  end;
```

F I G. 12

(1) IF IL IS OMITTED, CLOCK SKEW IS HANDLED AS 0

```
model CZEU2ALU_A;
end;
```

(2) FIRSTLY OUTPUT IL HAVING GROUP NAME IL IS SET TO DEFAULT VALUE, AND PRECEDENCE IS GIVEN TO ILn IF ILn COEXISTS

```
model CZEU2ALU_A;
IL 0  AA35B/FF1, AA36B/FF1,
      AB35B/FF1, AB36B/FF1, ...;
IL1 100 AB35B/FF1, AB36B/FF1, ...;
IL2 500 CD35B/FF1, CD36B/FF1, ...;
end;
```

(3) IL GROUP NAME IS DEFINED TO BE ILn (n=1, 2, ...). GROUP NUMBER MAY BE RANDOM

```
model CZEU2ALU_A;
IL1 -300 AA35B/FF1, AA36B/FF1, ...;
IL5 -100 AB35B/FF1, AB36B/FF1, ...;
IL3  500 CD35B/FF1, CD36B/FF1, ...;
end;
```

(4) IF IL GROUP NAME IS DOUBLY DEFINED, WARNING IS ISSUED AND PRECEDENCE IS FUNDAMENTALLY GIVEN TO LATER STATEMENT

```
model CZEU2ALU_A;
IL1 -300 AA35B/FF1, AA36B/FF1, ...;
IL1 -300 AA35B/FF1, AA36B/FF1, ...;
(EXAMPLE WHERE EXACTLY THE SAME STATEMENT IS SPECIFIED)
IL5 -100 AB35B/FF1, AB36B/FF1, ...;
IL5  200 AB35B/FF1, AB36B/FF1, ...;
(EXAMPLE WHERE SKEWS ARE DIFFERENT.
LATER STATEMENT IS APPLIED)
IL3  500 CD35B/FF1, CD36B/FF1, ...;
IL3  500 GH35B/FF2, SG38B/FF1, ...;
(EXAMPLE WHERE FFs ARE DIFFERENT. BOTH STATEMENTS
ARE ADOPTED, AND ALL FFs ARE APPLIED)
end;
```

(5) IF FF IS DOUBLY DEFINED, WARNING IS ISSUED AND PRECEDENCE IS FUNDAMENTALLY GIVEN TO LATER STATEMENT

```
model CZEU2ALU_A;
IL1 -300 AA35B/FF1, AA36B/FF1, ...;
IL2 -200 AA35B/FF1, AA36B/FF2, ...;
IL5 -100 AB38B/FF2, AB35B/FF1, ...;
(EXAMPLE WHERE FF IS SPECIFIED IN MULTIPLE GROUPS.
LATER STATEMENT IS APPLIED)
end;
```

FIG. 13

NET NAMES IN BLOCK DIAGRAM AND SIGNAL FLOWS ARE DISPLAYED ON DESIGN PLANNER SCREEN

TIMING BUDGET DESIGNING METHOD

BACKGROUND OF THE INVENTION

1. Field of the Invention

The present invention relates to a timing budget designing method in a design stage of an LSI, and more particularly, to a method that can design an LSI while suitably considering signal delays when logical blocks of the LSI are laid out.

2. Description of the Related Art

Conventionally, an LSI design is composed of a floor plan step of determining in which LSI portions logical blocks are laid out after building up a logic and dividing the logic into the logical blocks, a step of replacing the logical blocks laid out by the floor plan with elements such as transistors, etc., and a step of wiring the elements.

However, with the above described conventional designing method, at the time of a floor plan, layout of logical blocks is determined without examining whether or not signal delays occurring when a logic circuit is wired conform to predetermined specifications. Therefore, if the logic circuit is actually formed by replacing the logical blocks with elements, and the logical blocks are wired, signal delays do not conform to specifications in some cases.

Since the layout of logical blocks must be conventionally changed at this time, a procedural return is frequently made to the floor plan step so as to redo the operations. Remaking a floor plan in the operations redone frequently includes how to divide a logic into blocks.

As described above, with the conventional LSI designing methods, a redo frequently occurs, and a lot of time is required for design, and at the same time, a designer requires much labor, leading to an increase in design cost.

This is because operations are performed without considering any signal delays, and as a result, signal delays do not conform to specifications frequently when a logic circuit is actually arranged.

SUMMARY OF THE INVENTION

An object of the present invention is to provide a timing budget designing method that can lay out logical blocks while suitably considering signal delays in an initial stage of an LSI design.

A timing budget designing method is a method that advances an LSI design while evaluating a timing budget. This method comprises the steps of: designing a logic embedded into an LSI, and dividing the logic into logical blocks; setting a delay value between pins of a logical block, and building a signal delay model; displaying the set delay value for a designer along with an interconnection relationship among the logical blocks; and designing the logical block while considering the delay value.

According to the present invention, a timing budget designing method that advances an LSI design while considering the delay values of logical blocks is provided, so that it becomes possible to decrease the number of situations where a signal delay does not fall within a required time frame in an advanced stage of LSI design. Consequently, the number of times that operations must be redone in a design stage, and design cost can be reduced. As a result, an efficient LSI design can be implemented.

BRIEF DESCRIPTION OF THE DRAWINGS

FIG. 3 explains a modification of a modeling method for a timing condition of a logical block according to the preferred embodiment of the present invention;

FIG. 5 exemplifies a calculation expression of a path delay;

FIG. 6 explains the method checking whether or not a delay between memory elements, which straddles blocks, falls within a target delay from an inter-block netlist and a block timing description, and outputting a checking result (No. 1);

FIG. 7 explains the method checking whether or not the delay between memory elements, which straddles blocks, falls within a target delay from an inter-block netlist and a block timing description of a block (No. 2);

FIG. 8 explains the method generating a timing budget of a logical block, with which a timing condition of a logical block is converted into signal arrival and departure times of input and output pins;

FIG. 12 exemplifies a description of grouping internal memory elements;

FIG. 13 explains the method making rules in order to simplify a description in a method providing a clock skew to internal memory elements in a timing budget description or timing condition description of a block;

DESCRIPTION OF THE PREFERRED EMBODIMENTS

Figure 1:
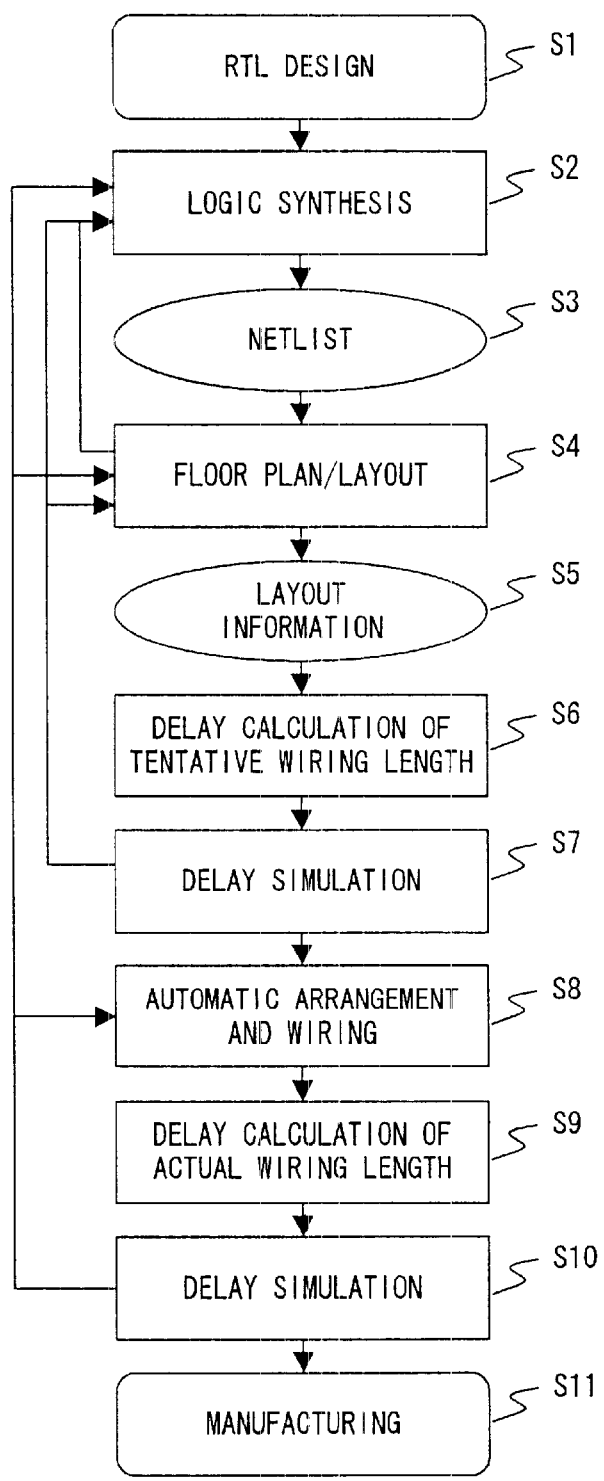
FIG. 1 explains an LSI design/manufacturing stage to which a preferred embodiment according to the present invention is applied.

FIG. 1 explains an LSI design/manufacturing stage to which a preferred embodiment according to the present invention is applied.

step S1 is a stage called RTL (Register Transfer Level) design, in which a logic to be mounted on an LSI is designed by using an RTL description. In the preferred embodiment according to the present invention, in the RTL design stage, a designer determines a signal delay value with his or her own estimation, and designs a logical block while calculating an approximate delay value between logical blocks. Consequently, a delay value can be set to an approximately desirable value when logical blocks are wired.

In step S2, logic synthesis (logic construction) among the logical blocks is made based on the RTL description generated in step S1. Once the RTL description is obtained, the synthesis can be automatically made with an existing program. As a result of the logic synthesis in step S2, a netlist is generated in step S3. The netlist is data indicating how to logically connect components such as transistors mounted on an LSI.

In step S4, a floor plan for determining in which LSI portions the logical blocks are laid out is generated based on the netlist obtained in step S3. The preferred embodiment according to the present invention is used also in the stage where the floor plan is generated. Namely, how components are connected can be learned from the netlist. Therefore, a delay value when the logical blocks are connected can be calculated from these pieces of information, and whether or not the delay value results in a value required for the operations of the LSI can be determined. Here, if the delay value does not satisfy the required value, the process goes back to the logic synthesis in step S2, and a netlist is regenerated. If the delay value satisfies the required value in the floor plan generation in step S4, the layout information of the logical blocks can be obtained.

When the layout information is obtained in step S5, the logical blocks are arranged based on the obtained layout information, and tentative wiring is conducted. Then, in step S6, a delay calculation is made from a wiring length based on the tentative wiring, and a delay simulation is performed in step S7.

Since the tentative wiring is conducted, the presence of a delay due to a detour of wiring, which is not learned from the netlist, and the like become apparent. Here, if the delay value does not fall within the required value as a result of the delay simulation, a floor plan is regenerated in step S4. If even the regeneration of a floor plan in step S4 is considered to be insufficient, the process goes back to the logic synthesis in step S2. Then, the operations are again performed.

If the delay value is proved to fall within the required value in the delay simulation in step S7, components within the respective logical blocks are automatically arranged and wired in units of cells in step S8. Then, a delay calculation is made in step S9 in the state where all the components are arranged and wired. In step S10, a delay simulation is performed. If the delay value is determined not to fall within the required value in the delay simulation in step S10, the operations are repeated, for example, by again conducting the automatic arrangement and wiring in step S8, by regenerating a floor plan, or by again performing logic synthesis. If the delay value is determined to fall within the required value in the delay simulation in step S10, the LSI design is recognized to have been complete. The process therefore enters a manufacturing stage of step S11.

Figure 2:
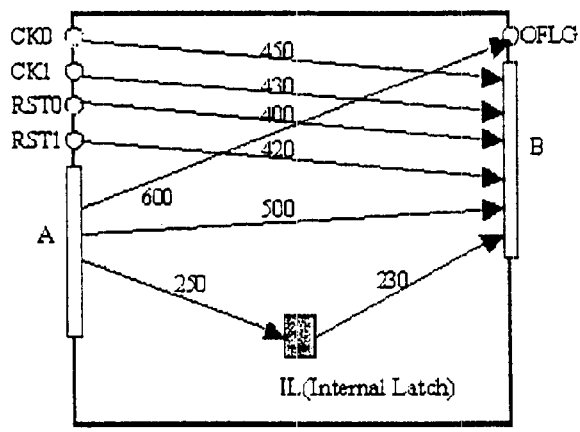
FIG. 2 explains the method setting a timing condition of a logical block in a timing budget designing apparatus according to a preferred embodiment of the present invention.

FIG. 2 explains the method setting a timing condition of a logical block in a timing budget designing apparatus according to a preferred embodiment of the present invention.

A portion enclosed by a square in FIG. 2 shows the state of a logical block of a model representing a delay value distribution for evaluating a timing budget, and delay value settings defined within the logical block. Additionally, a description in an upper portion of FIG. 2 states the model of the delay value distribution of the logical block.

In this preferred embodiment, a timing condition of a logical block is described by making one or a plurality of internal latches represent a large number of internal memory elements, FFs, etc., which should be included within a logical block.

If this preferred embodiment is used in the RTL design stage, timing of a logical block is roughly assigned by designer's intuition in units of logical blocks according to a cycle time of an entire chip, or estimated according to the size of a logical block or the number of internal cells. If this preferred embodiment is used in the stage of floor plan generation, a person responsible for designing each logical block describes a timing condition by calculating a delay value based on a representative value of RC (resistor and capacitor) obtained from technological information (characteristic data provided by a manufacturer of each component) for each path while viewing a connection of internal cells, based on the information of a netlist.

In the description in the upper portion of FIG. 2, two pin groups are defined. The pin groups are named pingrp A and pingrp B. pingrp A includes pins ADDRA_T, ADDRA_C, ADDRB_T, and ADDRB_C, each of which is composed of a bit 0 to a bit 11, and NULL_T and NULL_C, each of which is composed of a bit 0 to a bit 2, and the like. Similarly, pingrp B includes DOUT and XDOUT composed of a bit 0 and a bit 11.

Additionally, internal memory elements such as FF1, FF2, FF3, etc. are defined as one internal latch IL 0. Furthermore, a description "path from A to B delay 500" defines that a delay value of a path from a pin A (the pin group A in this case) to a pin B (the pin group B in this case) is 500 ps. Similarly, the description in the upper portion defines that a delay value from the pin A to a pin OFLG is 600 ps, a delay value from the pin A to the IL (Internal Latch) is 250 ps, a delay value from the IL to the pin B is 230 ps, a delay value from a pin CK0 to the pin B is 450 ps, a delay value from a pin CK1 to the pin B is 430 ps, a delay value from a pin RST0 to the pin B is 400 ps, and a delay value from a pin RST1 to the pin B is 420 ps. That is, modeling of a timing condition of one logical block is performed.

As described above, a large number of internal memory elements, which should originally exist, are represented by one or a plurality of internal latches, and a timing condition is described, so that the modeling of a timing condition of a logical block can be simplified.

FIG. 3 explains a modification of the modeling method for a timing condition of a logical block according to preferred embodiment of the present invention.

In this modification, logical blocks are hierarchically described in a timing condition description of the logical blocks. Namely, as shown in a lower portion of FIG. 3, a small logical block indicated as Block 1 is included in a logical block having a large outer frame. In this way, a degree of freedom of a timing condition description can be increased, and more accurate modeling can be implemented.

An upper portion of FIG. 3 exemplifies a timing description. Since a portion above a line indicated by (a) is similar to that in FIG. 2, its explanation is omitted. A portion below the line indicated by (a) sets delay values of paths that pass through Block 1. For Block 1, two inputs and two outputs are arranged. The portion below the line (a) defines that a delay value from a pin A to a pin in1 of Block 1 is 200 ps, a delay value from the pin A to a pin in2 of Block 1 is 150 ps, a delay value from a pin out1 of Block 1 to a pin B is 300 ps, and a delay value from a pin out2 of Block 1(?) to the pin B is 250 ps. Also delays within Block 1 can be set (although they are not included in the description). For example, the delays can be set as shown in a lower right portion of FIG. 2.

Furthermore, as described above, each timing condition description in this preferred embodiment can be generated from a netlist, after the netlist is generated.

Figure 4:
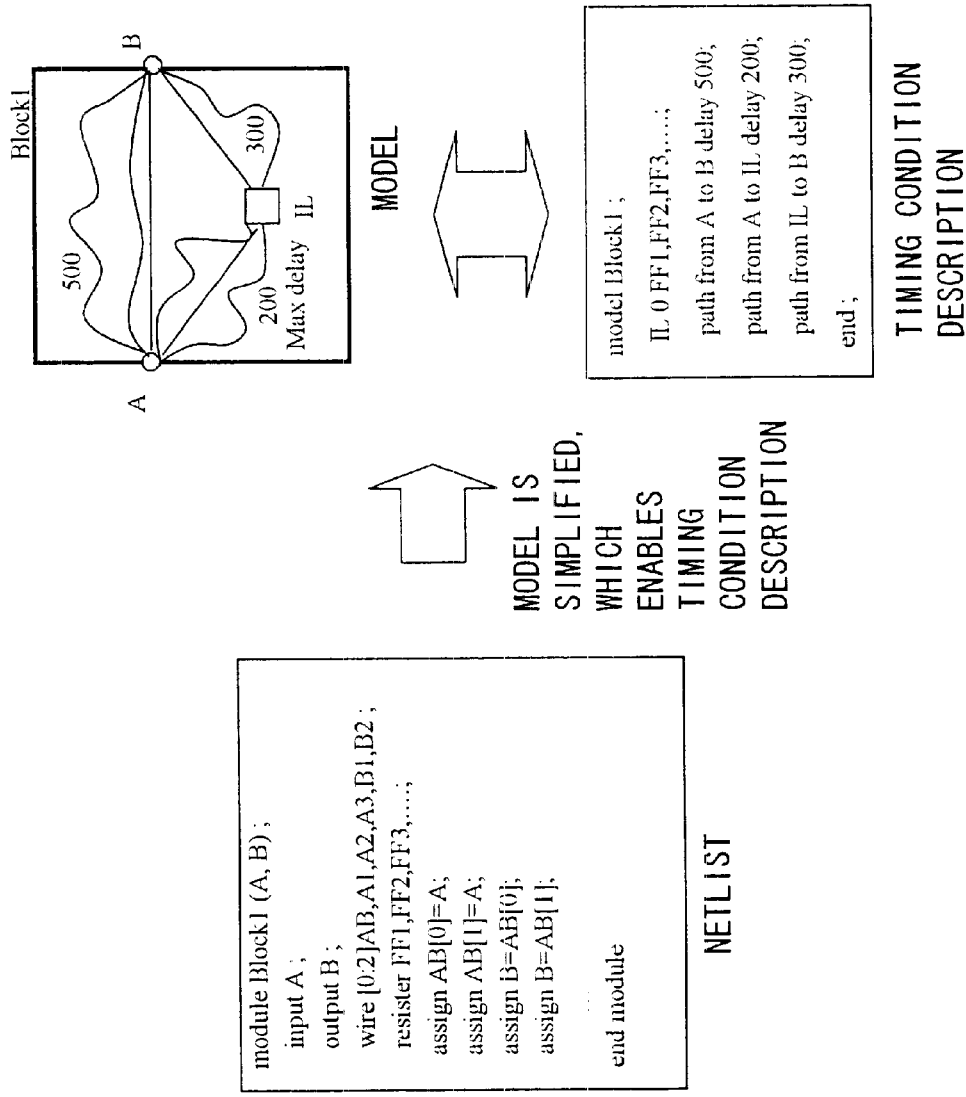
FIG. 4 explains the relationship between a netlist, a timing condition description, and a model.

FIG. 4 explains the relationship between a netlist, a timing condition description, and a model.

If a model is simplified from a netlist and generated to enable a timing condition description as shown in FIG. 4, a timing condition description of a logical block is generated by obtaining the following three types of delays.

a maximum delay of a path from one input pin to all of internal memory elements a maximum delay of a path from one input pin to one output pin a maximum delay of a path from all of internal memory elements to one output pin Namely, internal memory elements are collectively represented by one or more internal latches in a model. Therefore, even if a netlist describes a plurality of internal memory elements and their interconnection relationship, they are converged into a connection to/from one or a plurality of internal latches in a model. Here, as a representative connection to an internal latch, the largest delay value among a plurality of connections to the internal latch described in the netlist is set. Also as a representative connection from the internal latch, the largest delay value is set.

Additionally, also for a connection from a pin to a pin within a logical block, a plurality of paths can possibly be described in a netlist. In this case, a path having the largest delay value is set as one representative among the plurality of paths. In this way, a timing condition description is performed based on a built model.

Here, as described above, delay values are calculated based on technological information after a netlist is generated.

FIG. 5 exemplifies a calculation expression of a path delay.

In this figure, it is verified whether or not a delay value of a path which starts from an internal latch of Block 1 and terminates at an internal latch of Block 3 via Block 2 falls within a cycle time of a chip (assumed to be 1000 ps here).

The calculation is made as follows. Firstly, it is assumed that a delay value of the internal latch, which is a transmitting side FF, is a. Also, it is assumed that a delay value from the internal latch to an output pin within Block 1 is b, a delay value from the output pin of Block 1 to an input pin of Block 2 is c, a delay value within Block 2 is d, a delay value from Block 2 to Block 3 is e, and a delay value from an input pin to an internal latch within Block 3 is f, and a delay value of the internal latch of Block 3 is g. A total of these delay value is a signal delay amount (a delay value of the path). By judging whether or not an amount obtained by adding a clock skew a to the signal delay amount falls within 1000 ps, which is the cycle time of the chip, it can be determined that the delay value is suitably designed.

FIGS. 6 and 7 explain the method checking whether or not a delay between memory elements, which straddles blocks, falls within a target delay according to an inter-block netlist and a timing condition description of a block, and outputting a checking result.

FIG. 6 is a flowchart showing the process for generating a path delay list.

Firstly, in step S20, a netlist, a timing description, and a cycle time are input. Then, a path is extracted from the netlist in step S21. In step S22, a delay value of the path is calculated with the calculation expression explained with reference to FIG. 5. Then, in step S23, it is determined whether or not the delay value of the path exceeds the cycle time. If the delay value does not exceed the cycle time, the process goes to step S21, and another path is processed. If the delay value of the path is determined to exceed the cycle time in step S23, a path list is output in step S24. A designer is then made to generate a new netlist or a floor plan.

FIG. 7 exemplifies path delay lists and a model.

An upper portion of this figure exemplifies the model, whereas its lower portion exemplifies the path delay lists. The first list among the lists in the lower portion of FIG. 7 describes a path that starts from an FF, passes through another block, and terminates at an FF of the other block. An output logical block is named FAD, and the path starts from an internal latch of the FAD. It is proved from the first line of the first list that the internal latch of the FAD is connected to a pin A148 of the FAD, and a delay value is 1552 ps. The next line indicates a net between blocks, which indicates a connection from the pin A148 of the FAD to a pin A64H of a block OPR. This net is named M_FAD_RESULT_BYTE7_P7. A delay value of this net is set to 0 ps. Furthermore, the last line of the first list describes a path from the pin A64H of the OPR to its internal latch, and a delay value is 129 ps. The delay value of the entire path, which is described in the second column from the right in the last row of the first list, is 1681 ps. The last column in the last row of the list describes a difference between 1000 ps, which is the cycle time, and the entire delay value. In this case, this column indicates that the delay value of the path is larger than the cycle time by 681 ps.

Since how to read the other lists is similar, an explanation is omitted.

FIG. 8 explains the method generating a timing budget of a logical block, with which a timing condition of a logical block is converted into signal arrival and departure times of input and output pins.

Arrival time and Departure time are respectively generated for input and output pins as follows. A generation method is determined by calculating a maximum delay until an internal memory element with tracing of a path from each pin in a backward direction.

Setting formats of Arrival and Departure times in a model are exemplified below.

input pin format input_delay passage time input pin name

As the passage time, a passage time of a path having the largest delay value among paths that pass through the input pin is set.

The input pin name is the name of an input pin of a block to be processed.

output pin format output_delay passage time output pin name

As the passage time, a passage time of a path having the largest delay value among paths that pass through the output pin is set.

The output pin name is the name of an output pin of a block to be processed.

In a description example in a lower portion of FIG. 8, A01, A02, A03, . . . are shown as input pins of Block 1, and 001, 002, . . . are shown as output pins of Block 1. An arrival time of an input pin is an arrival time of a path having the largest delay value among the totals of delay values of portions of paths, which pass through the input pin, and are traced in a backward direction until an internal latch of any of logical blocks. In this example, an arrival time of the input pin A01 is 431.00 ps. This means that the maximum value of a propagation delay from an internal latch of any of the logical blocks is 431.00 ps, and a signal therefore arrives at the input pin A01 at the time 431.00 ps based on the assumption that a departure time of the internal latch is 0. Similarly, the description indicates that an arrival time of the input pin A02 is 423.00 ps, and an arrival time of the input pin A03 is 531.00 ps.

Additionally, a departure time of an output pin is a time obtained by adding to an arrival time of an input pin a delay value of a path having the largest delay value total among paths traced from the output pin until the input pin within the logical block. Accordingly, a departure time of the output pin O01 is 802.0 ps, and a departure time of the output pin O02 is 822.00 ps.

Note that input and output pins other than the pins shown in FIG. 8 are arranged in Block 1, and their descriptions are omitted. Accordingly, the description shown in this figure does not mean that a signal is always input to the input pin A01 at the time 431.00 ps, and always output from the output pin O01 at the time 802.00 ps. This description is general, and signals output from the output pins O01 and O02 may not necessarily be input from any of the input pins A01, A02, and A03.

Figure 9:
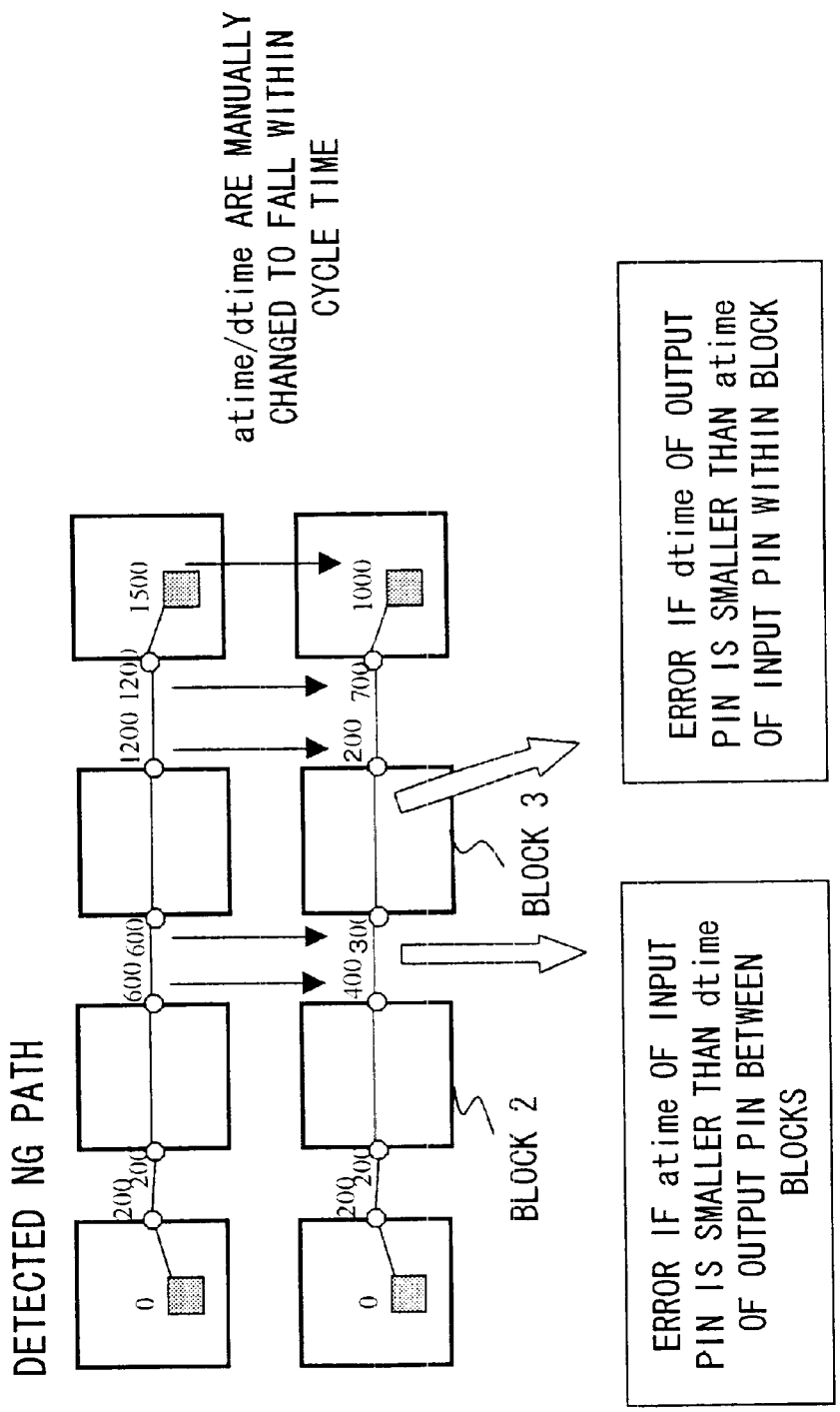
FIG. 9 shows a processing method used when a delay value does not satisfy a required value as a result of calculating a delay value of each path by using the preferred embodiment according to the present invention.

FIG. 9 shows a processing method used when a delay value does not satisfy a required value as a result of calculating the delay value of a path according to the preferred embodiment of the present invention.

In this preferred embodiment, it is checked whether or not an inconsistency arises in a timing budget (a tolerable range of a timing shift) when the timing budget is modified.

Namely, if a path (NG path) on which an arrival time of a signal does not fall within a cycle time is detected as shown in FIG. 9, a designer recognizes this path on a screen, and manually modifies arrival and departure times of input and output pins of each logical block. Assume that the manual modifications result in a lower portion of FIG. 9. In this case, the value of an input time atime of Block 3 is smaller than that of an output time dtime of Block 2 in a preceding stage. The phenomenon that the arrival time of Block 3 is a time earlier than the departure time of Block 2 when a signal propagates from Block 2 to Block 3 is inconsistent. Therefore, this is regarded as an error, and warning is issued to a designer, for example, by changing a display color of the erroneous time. Similarly, the phenomenon that the output time dtime of the output pin is smaller than the arrival time atime of the input pin in Block 3 is inconsistent. Therefore, this is regarded as an error, and warning is issued to the designer in a similar manner.

As described above, a model according to the above described preferred embodiment is displayed on a screen of a designer's terminal, and the designer is allowed to modify the model with a keyboard, etc., whereby a design can be efficiently made.

Figure 10:
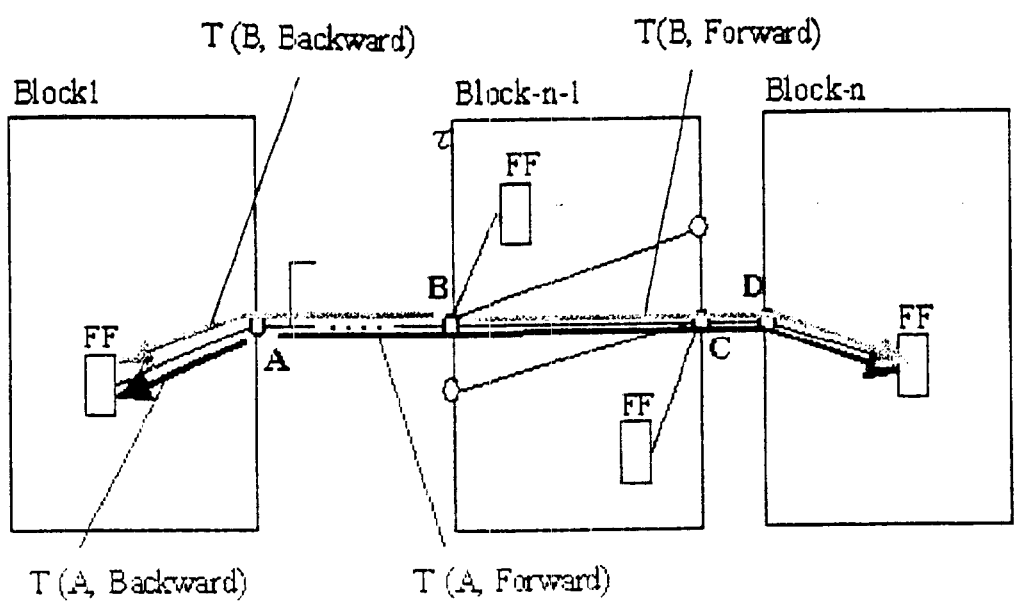
FIG. 10 explains another example of the method modifying a timing budget.

FIG. 10 explains another example of the method modifying a timing budget.

Additionally, the following method exists as a method modifying arrival and departure times when an arrival time of a path does not fall within a cycle time as described above.

Namely, if a delay between memory elements, which straddles blocks, does not fall within a target delay, a timing budget description of the blocks is automatically generated with a proportional distribution calculation so as to make the delay fall within the target delay. A calculation expression for this implementation is the following equation.

$$\text{arrival time of } A = \tau \times \frac{T(A, \text{Backward})}{T(A, \text{Backward}) + T(A, \text{Forward})}$$

$$\text{arrival time of } B = \tau \times \frac{T(B, \text{Backward})}{T(B, \text{Backward}) + T(B, \text{Forward})}$$

where $\tau$ is a cycle time of a circuit, T(A,Backward) is a max value when a trace is made from A to a starting point in a backward direction, and T(A,Forward) is a max value when a trace is made from A to an end point in a forward direction. Also B, C, and D are similar.

By adjusting arrival and departure times with such a proportional calculation, a delay value of each path can be evenly adjusted. This operation may be performed by a computer, only a result may be presented to a designer (for example, by displaying a result on a screen of a terminal), and the designer may be made to determine whether or not to use the result.

Additionally, it becomes more convenient by leaving a block that has already been designed unchanged, when a proportional distribution is made as described above. That is, different designers design the insides of respective logical blocks. Upon receipt of a notification that a different designer has completed his or her responsible block, a block that has not yet been designed is made to absorb a timing shift without making the different designer redesign the completed block so as to change its delay values. As a result, a block that is designed earlier is to be left unchanged, so that a design proceeds without going back to an earlier stage many times.

Furthermore, the above described method determining a timing budget with a proportional distribution for pins of a block is applied also to the case where a block that has not yet been designed is made to absorb an adjustment of a timing budget. When a block has been designed, the block is left unchanged in a timing budget like fashion, and a proportional distribution is made for blocks that have not yet been designed. As a result, an adjustment of the timing budget can be evenly adjusted by the blocks that have not yet been designed, and a load imbalance, such as timing budget absorption made by one block, can be prevented.

Figure 11:
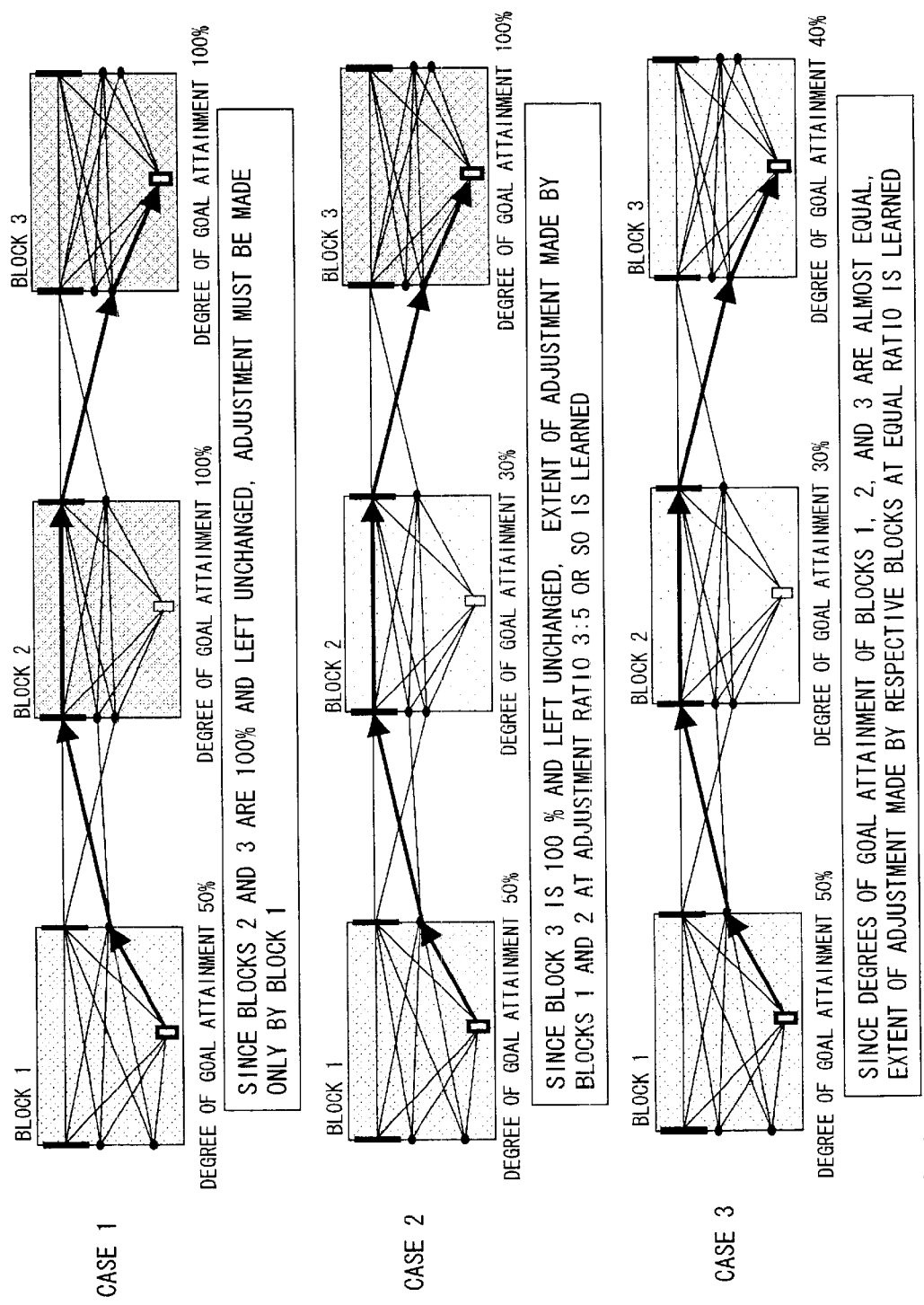
FIG. 11 explains the method adjusting a timing budget while adding a degree of goal attainment.

FIG. 11 explains the method adjusting a timing budget while taking the degree of goal attainment into account. When a proportional distribution of a timing budget is performed as described above, the degree of goal attainment of each block is displayed, and an adjustment is made while taking the displayed degree into account. The degree of goal attainment of each block varies depending on a design stage. Assume that Block 1 is desired to be adjusted. In this case, to what extent an adjustment should be made is uncertain in many cases, because the delay tolerance of Blocks 2 and 3 are not learned. If the degrees of goal attainment of Blocks 2 and 3 are assumed to be 100 percent and left unchanged in this case, a delay must be adjusted only by Block 1. If the degree(s) of goal attainment of another or other associated blocks are displayed at this time, which blocks should make an adjustment is apparently proved. A proportional distribution is performed while taking such a degree of goal attainment into account.

The degree of goal attainment is represented by a designer of each block as approximate percentage that indicates the proceeding status of his or her design operations. Namely, if the degree of goal attainment is 100 percent when a delay is adjusted with a proportional distribution, the amount of adjustment is set to 0. For example, if the degrees of goal attainment of two blocks are respectively 30 and 50 percent, a proportional distribution is performed by assigning a weight of 5:3.

FIG. 11 explains the above described method applied to various cases.

In Case 1, the degrees of goal attainment of Blocks 2 and 3 are 100 percent. Therefore, a block that can adjust a delay is only Block 1 on a path from Block 1 to Block 3, so that the delay must be adjusted within Block 1. In Case 2, the degree of goal attainment of Block 3 is 100 percent, and a delay cannot be adjusted within Block 3. However, the degrees of goal attainment of Blocks 1 and 2 are respectively 50 and 30 percent. Accordingly, the delay may be adjusted by Blocks 1 and 2. For example, a ratio of a delay adjustment made by Blocks 1 and 2 may be set to 3:5. In Case 3, the degrees of goal attainment of Blocks 1, 2, and 3 are respectively 50, 30, and 40 percent. Therefore, all of Blocks 1 to 3 can be used to adjust a delay. An adjustment ratio at this time may be set to 1/5:1/3:1/4. Or, the delay may be adjusted at an equal ratio of the respective blocks by recognizing that the degrees of goal attainment of the blocks are approximately equal.

Furthermore, if a timing budget description (a description of arrival and departure times of a block) is converted into a timing condition description (a description of delay values), a delay value from a pin A to a pin X is calculated as q-p in the timing condition description, for example, when atime=p for the input pin A, and dtime=q for the output pin X.

FIG. 12 exemplifies a description for grouping internal memory elements.

In the preferred embodiment according to the present invention, a clock skew can be provided to internal memory elements in a timing budget description or a timing condition description of a logical block.

For this implementation, internal memory elements are grouped, names such as IL1, IL2, ... , ILn, etc. are given, skew values are respectively specified for the groups, and the internal memory elements belonging to the respective groups are enumerated.

An example of a description is shown in FIG. 12. In this figure, internal latches IL1 to IL4, which represent internal memory elements, are described in a model named CZEU2ALU_A. For IL1, IL2, IL3, and IL4, clock skews are respectively set to 0, 100, 300, and −100 ps. Additionally, internal memory elements having such clock skews are described in respective lines, and grouped.

FIG. 13 explains a method making rules so as to simplify a description in a method providing a clock skew to internal memory elements in a timing budget description or a timing condition description of a logical block.

If a symbol IL is omitted in a model as shown in (1) of FIG. 13, a clock skew is handled as 0. A skew value of a group having a name IL is recognized to be set to a default value as shown in (2) of FIG. 13. If the same internal memory element is included in both of a group having a name ILn (n is an integer) and the group having the name IL, precedence is given to the setting of ILn. Furthermore, as shown in (3) of FIG. 13, the group name of an internal latch IL is defined to be ILn. For a description of groups, a group having a larger value of n may be described ahead of a group having a smaller value of n, and group names may be specified by using n that is not serial but random. Additionally, if the group name of IL is doubly defined as shown in (4) of FIG. 13, warning is issued, and precedence is given to the setting of a later description statement in a description order of IL groups. If an FF being a different internal memory element is doubly defined, warning is issued, and precedence is fundamentally given to a later group definition statement.

Figure 14:
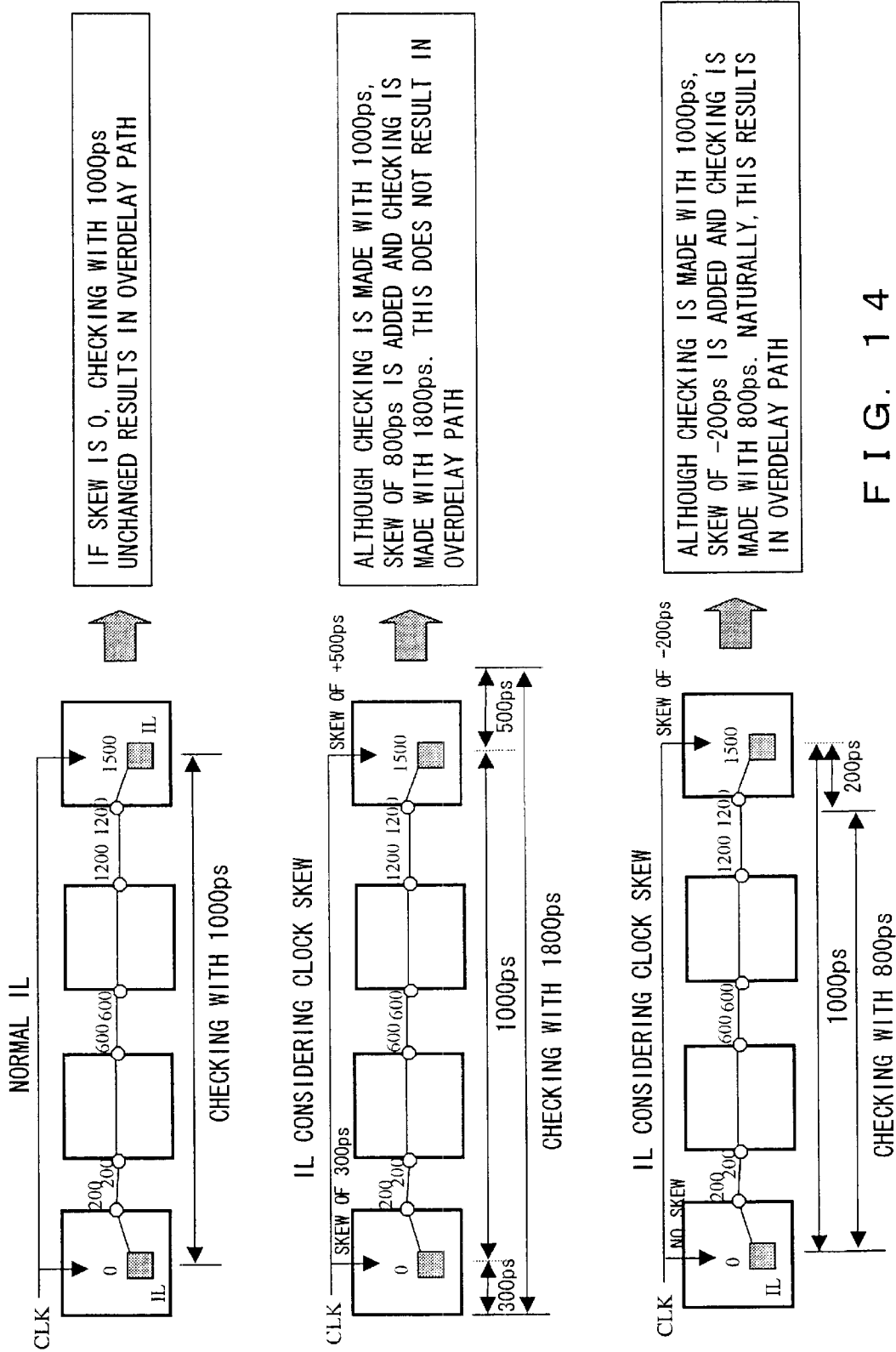
FIG. 14 exemplifies timing checking in consideration of a clock skew.

FIG. 14 exemplifies timing checking in consideration of a clock skew.

Here, it is checked whether or not a delay between memory elements, which straddles blocks, falls within a target delay according to an inter-block netlist, a timing condition description of blocks, and the above described block skew of internal memory elements.

For example, if a clock skew is 0 ps as shown at the top of FIG. 14, a timing adjustment is made by checking whether or not a timing time of a path obtained from the above described description of arrival and departure times falls within a cycle time (1000 ps in this case). Additionally, if the clock skew of an internal latch IL on a transmitting side is −300 ps and that of an internal latch IL on a receiving side is 500 ps as shown in the middle of FIG. 14, it is checked whether or not timing falls within 1800 ps that is obtained by adding 300 and 500 ps to the normal cycle time 1000 ps. This is because the internal latch on the transmitting side is ahead by 300 ps, whereas the internal latch on the receiving side is behind by 500 ps. Therefore, even if the timing is behind by a time period obtained by adding 800 ps including the clock skew to the cycle time, it is still sufficient to catch the timing in accordance with a clock. If the clock skews of internal latches on transmitting and receiving sides are respectively 0 and −200 ps as shown at the bottom of FIG. 14, a clock on the receiving side is ahead by 200 ps. Therefore, a signal must reach earlier by this amount of time. Accordingly, the timing of the path must fall within 800 ps that is obtained by subtracting 200 ps from the cycle time 1000 ps.

In this way, a timing adjustment can be made in consideration of clock skews.

Figure 15:
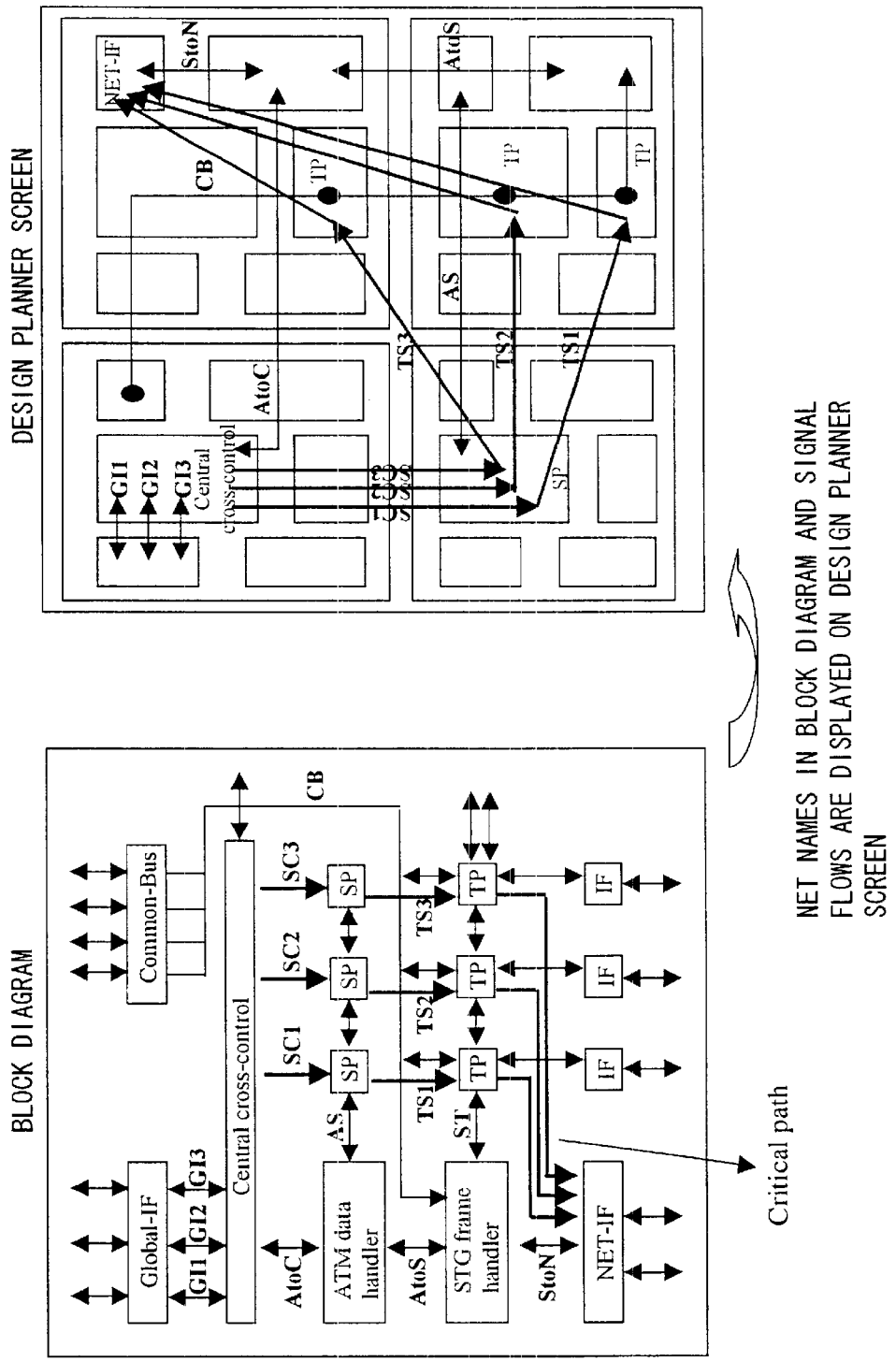
FIG. 15 explains the method displaying a signal or a path in a floor plan according to the preferred embodiment of the present invention.

FIG. 15 explains a method displaying signals or paths in a floor plan according to the preferred embodiment of the present invention.

With this displaying method, signals and critical paths in a block diagram are displayed in a floor plan on a screen of a terminal that a designer uses, based on a correspondence table between signal names in the block diagram and those in a netlist.

A block diagram shown on the left side of FIG. 15 depicts an interconnection relationship among functional blocks. In the meantime, the right side of FIG. 15 is a design planner screen, and depicts the layout of actual elements and functional blocks on an LSI. Such schematics are displayed on a screen of a terminal on which a design tool that a designer uses is installed. The designer describes signals and wiring in the block diagram for a display, so that he or she can visually recognize on which paths the described signals pass and propagate, or on which paths the described wiring is conducted, on the designer planner screen.

As a result, it can be checked whether or not signal flows or wiring of a designed LSI are undesirably laid out.

Figure 16:
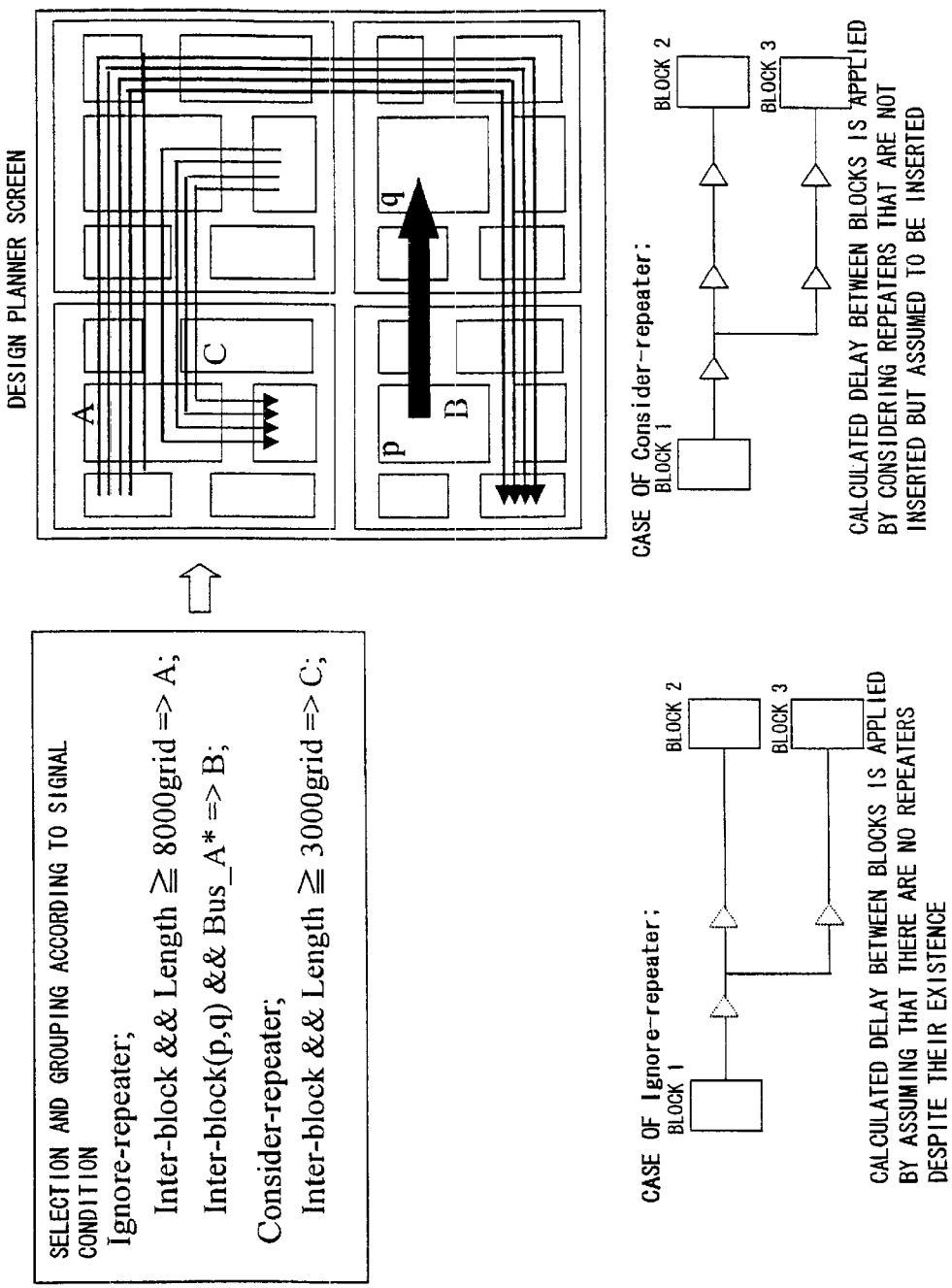
FIG. 16 explains another example of the displaying method in FIG. 15.

FIG. 16 shows another example of the displaying method shown in FIG. 15.

In this preferred embodiment of the present invention, signals are grouped according to a condition, names are given to the groups, and signal flows are displayed in a floor plan based on the given group names.

For example, as indicated by a description in an upper left portion of FIG. 16, inter-block indicates wiring between blocks, Length≧8000 grid indicates that wiring having a length equal to or larger than 8000 grids on a design planner screen is displayed, and a name A is given to this group. Inter-block(p,q) indicates between blocks specified by p and q. Bus_A* indicates a block that is connected by a bus having this name, and grouped by a group name B. Inter-block&&Length≧3000 grid=>C is similar. A display example of this grouping is shown in an upper right portion of FIG. 16.

For example, if a wiring length is long like a group A, there is a high possibility that the wiring is normally conducted by tracing a very complicated path immediately after the design. Accordingly, wiring the length of which is long is displayed on a design planner screen, so that very helpful visual information for considering the optimization of wiring can be obtained.

Additionally, as shown at the bottom of FIG. 16, a condition is determined by assuming that there are no repeater cells, when signals are grouped by the condition.

This is effective for designing a new LSI while reusing design information of a previously designed LSI as resources. Namely, since the design information of the previously designed LSI is design information of a complete product, repeaters are inserted in many locations. However, when a new LSI is designed, it results in an LSI having functions different from those of the previous LSI. Therefore, a mounted logic and wiring differ. Accordingly, the locations of repeaters used to adjust timing are normally different from those of a previous LSI. Therefore, it is more efficient to start a design without using repeaters for estimation of delay values. Therefore, if the design information of a previous LSI is reused as resources, it is effective to determine and display the above described condition for a display, such as a signal condition, etc., by assuming that there are no repeaters.

In this case, signals are normally grouped in the state of "Consider-repeater" as shown in an upper left portion of FIG. 16. However, if repeaters are specified to be ignored, a condition is determined by supposing that there are no repeaters as in the case of "Ignore-repeater", and the signals are grouped.

A lower portion of FIG. 16 shows the concept in the case where repeaters are included in design information, but ignored at the time of a display. A delay amount differs depending on whether or not the repeaters are considered. Therefore, a delay is suitably designed by viewing the display.

Figure 17:
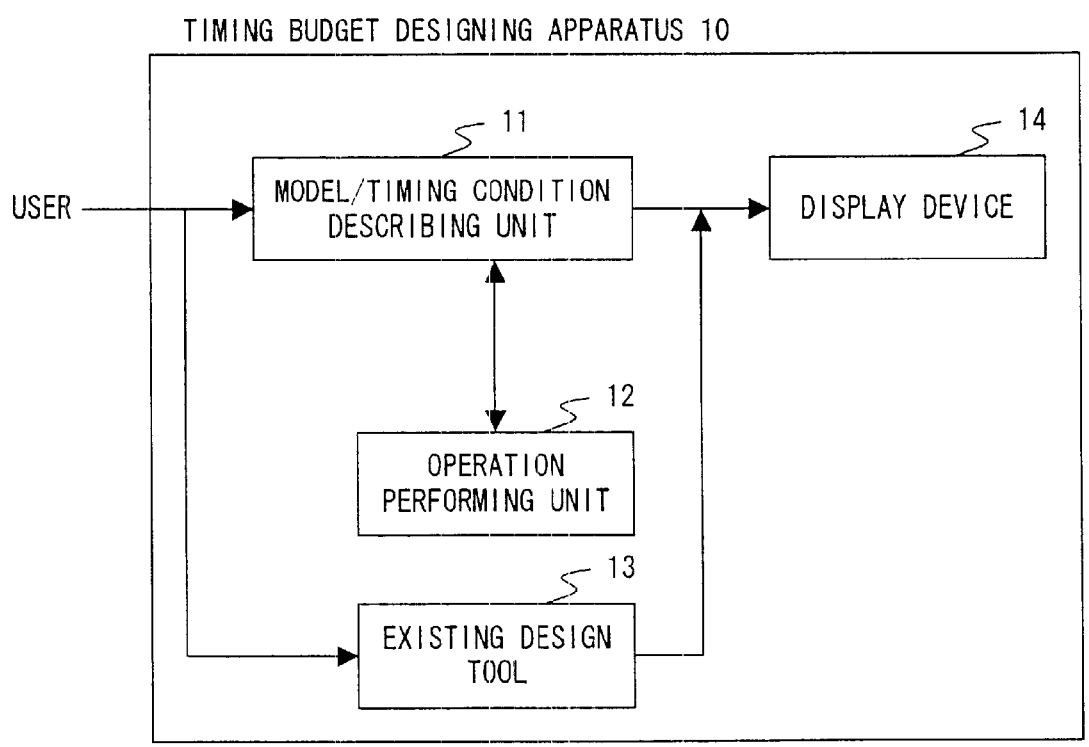
FIG. 17 is a block diagram showing the configuration of a timing budget designing apparatus according to the preferred embodiment of the present invention.

FIG. 17 is a block diagram showing the configuration of a timing budget designing apparatus according to the preferred embodiment of the present invention.

A timing budget designing apparatus 10 according to this preferred embodiment comprises a model/timing condition describing unit 11, an operation performing unit 12, an existing design tool 13, and a display device 14. A user who is an LSI designer designs an LSI with the existing design tool (13?). At this time, the user makes a design while displaying necessary information on the display device 14 when building a logical block, and generating a netlist or a floor plan. At this time, a design is made while evaluating a timing budget in this preferred embodiment according to the present invention. For this implementation, the timing budget designing apparatus 10 comprises the model/timing condition describing unit 11 and the operation performing unit 12 performing operations required for a model or a timing condition description.

The model/timing condition describing unit 11 interprets a model description and a timing condition description like those shown in FIG. 2, builds a model, and displays the built model on the display device 14. If a process for adjusting a timing budget, or a wiring display on a design planner screen is performed, the operation performing unit 12 is made to perform necessary operations, and the display device 14 is made to display a result of the operations.

The user who is an LSI designer interactively advances the design while viewing the display on the display device 14, and clears the design stages shown in FIG. 1 while adjusting a timing budget with a model.

Figure 18:
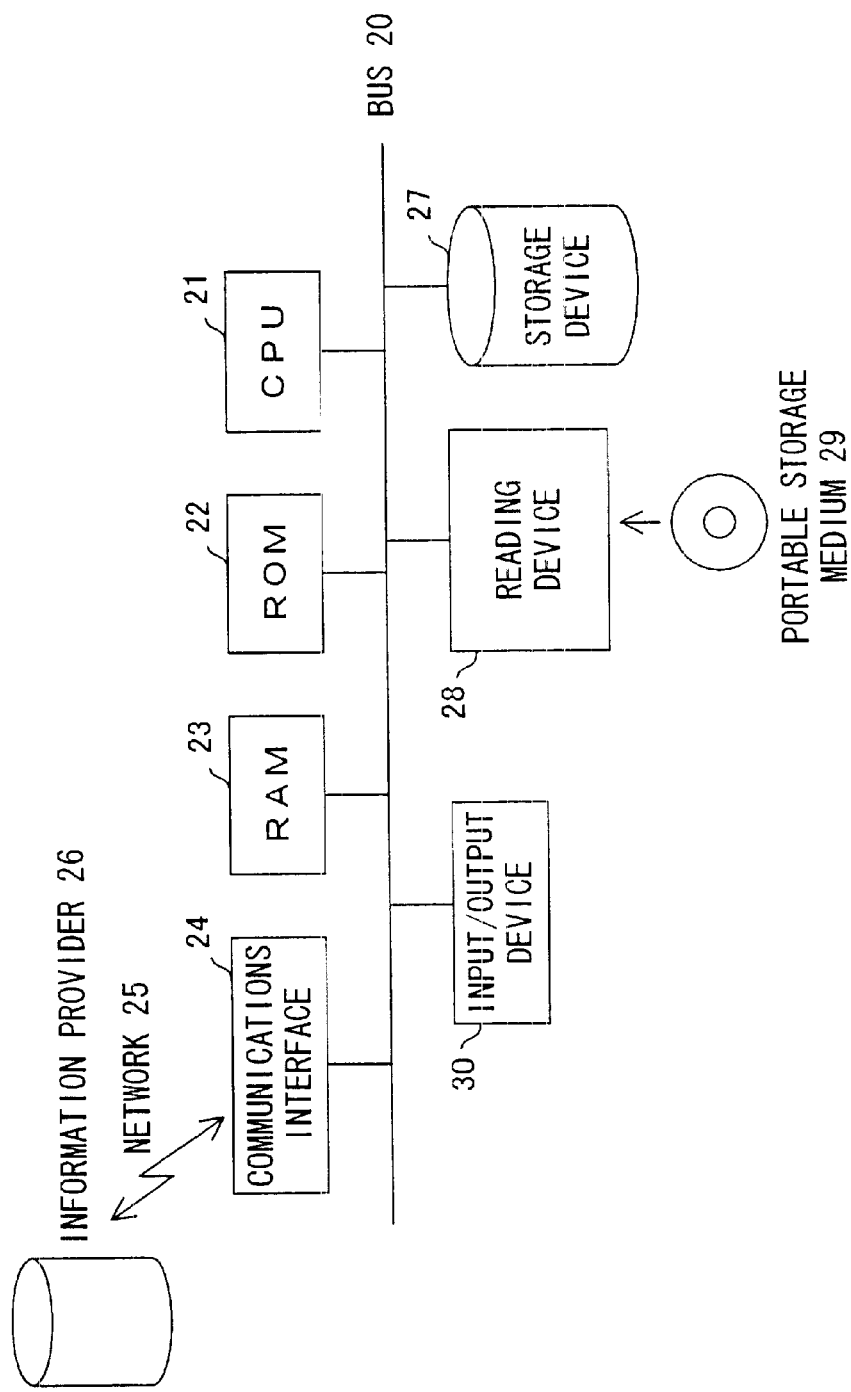
FIG. 18 explains the hardware environment of a computer required when the timing budget designing apparatus according to the preferred embodiment of the present invention is implemented by a program.

FIG. 18 shows the hardware environment of a computer required when the timing budget designing apparatus according to the preferred embodiment of the present invention is implemented by a program.

A CPU 21 executes a program while sequentially reading the program from a ROM 22 or a RAM 23, which is interconnected by a bus 20. The program implementing the preferred embodiment of the present invention is executed by the CPU21 after being copied from a storage device 27 such as a hard disk, etc. to the RAM 23. Or, the program recorded on a portable storage medium 29 such as a floppy disk, a CD-ROM, a DVD, an MO, etc. is read by a reading device 28, copied to the RAM 23, and executed by the CPU 32. Additionally, the program recorded on the portable storage medium 29 may be executed after being installed on a computer by being copied to the storage medium 27.

An input/output device 30 is configured by a keyboard, a mouse, a template, a CRT monitor, an LCD monitor, etc. The input device 30 notifies the CPU 21 of an input from a user, who is an LSI designer, as a command, or makes the storage device 27 store a model description such as a timing description, etc. Or, the input device 30 is used to graphically display a model, or to display a design planner screen.

A communications interface 24 connects a computer to an information provider 26 via a network 25, and enables the program to be downloaded from the information provider 26. Or, a connection may be made to a user, who is an LSI designer and designs another logical block, instead of the information provider 26, and the users may execute the program under the network environment to advance the design. In this case, the degree of goal attainment set by each designer can be notified to all users who are LSI designers via the network, whereby the design environment can be made more convenient.

According to the present invention, an LSI design is sequentially advanced while evaluating a timing budget. Therefore, it becomes possible to reduce the number of cases where signal transmission timing does not satisfy a required condition after a design is made in detail, thereby decreasing the number of redoes in a LSI design stage, and efficiently advancing the LSI design at less cost.

What is claimed is:

1. A timing budget designing method advancing a large-scale integrated circuit design while evaluating timing budget, comprising:

designing logic to be embedded into a large-scale integrate circuit with the logic divided into logical blocks:

building a signal delay model by setting a delay value between pins of a logical block and calculating signal arrival and departure times at and from each logical block from the delay value to describe a timing condition of signal propagation timing;

proportionally changing distribution of timing budget of internal memory elements in a path extending across at least two logical blocks, if the timing budget does not fall within a target value based on the timing condition displaying the delay value for a designer along with an interconnection relationship among the logical blocks; and designing the logical block while considering the delay value.

2. The timing budget designing method according to claim 1, wherein a timing budget of a logical block that has been designed is left unchanged when the timing budget is changed.

3. The timing budget designing method according to claim 1, wherein a timing budget of each logical block is changed in consideration of a degree of attainment of the design of each logical block.

* * * * *

UNITED STATES PATENT AND TRADEMARK OFFICE
CERTIFICATE OF CORRECTION

PATENT NO. : 6,684,374 B2  
APPLICATION NO. : 09/984782  
DATED : January 27, 2004  
INVENTOR(S) : Noriyuki Ito et al.

Page 1 of 1

It is certified that error appears in the above-identified patent and that said Letters Patent is hereby corrected as shown below:

Column 12, line 39, insert --a-- before "timing".

Column 12, lines 41-42, delete "integrate" and insert --integrated--.

Column 12, line 42, delete ":" and insert --;--.

Column 12, line 49, insert --a-- before "timing".

Column 12, line 52, insert --;-- after "condition".

Signed and Sealed this

Fourteenth Day of November, 2006

JON W. DUDAS  
*Director of the United States Patent and Trademark Office*